May 17, 1932. G. E. BEHNKE 1,858,980
ROLLER BIT
Filed Aug. 1, 1931

Guy E. Behnke
INVENTOR

BY
ATTORNEY

Patented May 17, 1932

1,858,980

UNITED STATES PATENT OFFICE

GUY E. BEHNKE, OF HOUSTON, TEXAS, ASSIGNOR TO REED ROLLER BIT COMPANY, OF HOUSTON, TEXAS, A CORPORATION OF TEXAS

ROLLER BIT

Application filed August 1, 1931. Serial No. 554,444.

This invention relates generally to deep well drilling apparatus and specifically to roller bits.

It has for its object the provision of a new and improved mounting for cutters of the conical type.

Conventional conical cutters are usually mounted on a tapered bushing that is connected to a spindle carried by the bit head. The spindle is cylindrical and occupies a large socket in the bushing so that the outer, smaller portion of the bushing cannot be reduced without objectionably weakening it. This invention provides a tapered spindle and a bushing having a socket for the reception thereof, so that the outer, smaller portion of the bushing may be reduced, but not weakened. And this construction permits the use of roller bearings.

Specific objects of the invention will hereinafter appear.

Figure 1:
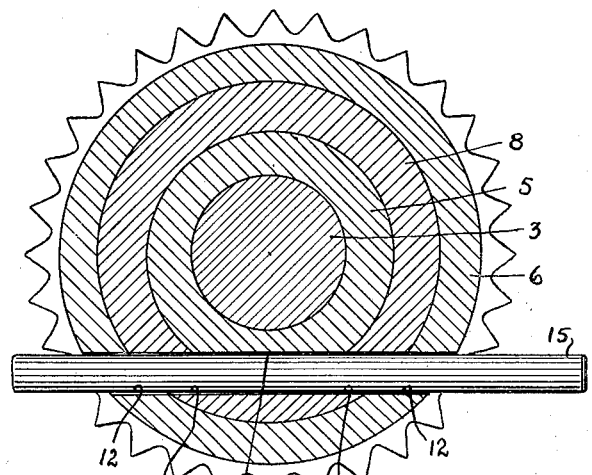
Figure 2:
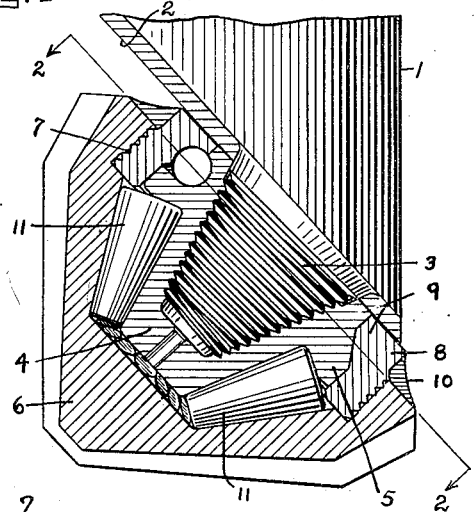

The preferred embodiment of the invention is illustrated by the accompanying drawings, of which Fig. 1 is a fragmentary, sectional elevation of a conical cutter mounted on a bit head; and Fig. 2 is a section on the line 2—2 of Fig. 1.

In the drawings, the bit head is indicated at 1. It has in its bottom a substantially V-shaped recess, one portion of which is indicated at 2. Projecting downwardly and inwardly into the recess 2 is a substantially frusto-conical, externally threaded spindle 3. Upon the spindle 3 is a substantially frusto-conical, internally threaded bushing 4 having adjacent its base portion an annular flange 5.

Upon the bushing 4 is a substantially frusto-conical cutter 6 having internal threads 7 in its base portion. A locking ring 8 has external threads to engage the internal threads 7 of the cutter 6 and an inwardly projecting portion 9 to engage the flange 5 of the bushing 4, and serves to hold the cutter 6 on the bushing 4. The cutter 6 and ring 8 may be welded, as indicated at 10.

Between the cutter 6 and bushing 4 are tapered roller bearings 11, supported by the flange 5. The smaller ends of the bushing 4, cutter 6 and rollers 11 are outermost and adjacent each other. Cylindrical bearing rollers, or ball bearings, may be substituted for the preferred tapered rollers 11 shown, the term "bearing rollers" being used hereinafter to cover any equivalent bearing elements.

The cutter 6, ring 8 and bushing 4 have openings 12, 13 and 14, respectively, for a tool 15 which may be inserted to lock the cutter 6, ring 8 and bushing 5 together so that the bushing 5 may be screwed on and off spindle 3.

It will be noted that the base portion of the spindle 3 is large to resist strains to which the bit is subjected in operation. It is, therefore, substantially as strong as the conventional cylindrical spindle, but its frusto-conical form provides room for the bearing rollers 11. The engaging threads of the spindle 3 and bushing 4 serve to securely hold the bushing on the spindle.

The parts are so constructed that the pin 15, employed to screw the bushing on and off the spindle, need not be large, because it is not subjected to very great strains.

Various other advantages of the mounting provided by this invention will be apparent to those skilled in the art. The invention is not limited to the preferred embodiment shown. Various changes may be made within the scope of the following claims.

I claim:

1. A drill having a head; a frusto-conical, externally threaded spindle carried by said head; a frusto-conical, internally threaded bushing on said spindle, said bushing having adjacent its base portion an external annular flange; a frusto-conical cutter on said bushing; bearing rollers between said bushing and cutter and supported by said flange; and a ring threaded in said cutter and engaging said flange to hold said cutter on said bushing; said cutter, ring and bushing having openings for a tool to permit said bushing to be removed from said spindle.

2. A drill having a head; a frusto-conical, externally threaded spindle carried by said head; a frusto-conical, internally threaded bushing on said spindle, said bushing having adjacent its base portion an external annular flange; a frusto-conical cutter on said bushing; bearing rollers between said bushing and cutter and supported by said flange; and a ring threaded in said cutter and engaging said flange to hold said cutter on said bushing.

3. A drill having a head; a frusto-conical, externally threaded spindle carried by said head; a frusto-conical, internally threaded bushing on said spindle; a frusto-conical cutter on said bushing; bearing rollers between said bushing and cutter; and means to hold said cutter on said bushing.

4. A drill having a head; a frusto-conical spindle carried by said head; a frusto-conical bushing on said spindle; a frusto-conical cutter on said bushing; and bearing rollers between said bushing and cutter.

5. A drill having a head; a tapered spindle carried by said head; a tapered bushing on said spindle; a tapered cutter on said bushing; and bearing rollers between said bushing and cutter.

6. A drill having a head; a frusto-conical, externally threaded spindle carried by said head; a frusto-conical, internally threaded bushing on said spindle; and a frusto-conical cutter on said bushing.

7. A drill having a head; a tapered spindle on said head; a tapered bushing on said spindle; a frusto-conical cutter on said bushing; and tapered bearing rollers between said bushing and cutter, the smaller ends of said bushing, rollers, and cutter being adjacent each other.

In testimony whereof I hereunto affix my signature.

GUY E. BEHNKE.